Jan. 15, 1952     E. N. BURNETT     2,582,527
NOZZLE VALVE
Filed Nov. 14, 1947
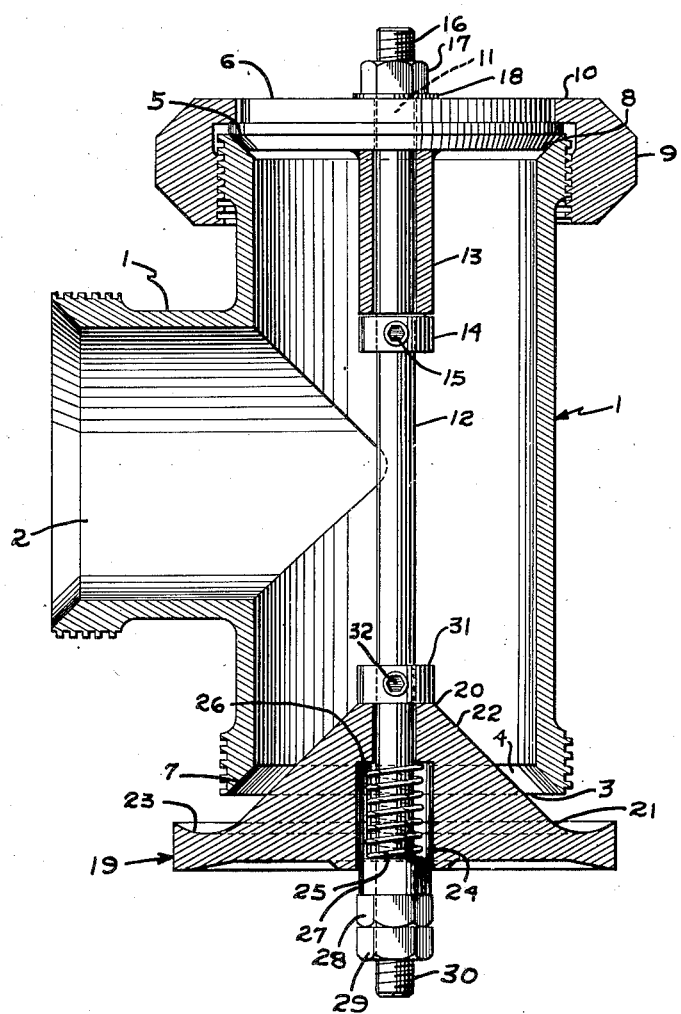
Inventor
EDWARD N. BURNETT
By
Semmes, Keegin, Robinson + Semmes
ATTORNEYS Patented Jan. 15, 1952

2,582,527

UNITED STATES PATENT OFFICE 2,582,527

NOZZLE VALVE

Edward Neal Burnett, San Lorenzo, Calif., assignor to Gerber Products Company, Fremont, Mich., a corporation of Michigan Application November 14, 1947, Serial No. 786,020

6 Claims. (Cl. 299—125)

This invention relates to a valve and more particularly to a non-clogging valve for controlling the flow of fluids containing solid particles.

In the canning of foods it is desirable to remove air from the food before it is placed in the cans to avoid deterioration of the food after the cans are closed. The deaeration is preferably accomplished by injecting a spray of the food into a partially evacuated chamber during which the air is liberated from the food. The conventional device for spraying the food is a perforated pipe which discharges the food in a number of fine streams. This device is satisfactory for liquid and pureed foods which will not clog the perforations in the pipe. However, a perforated pipe is not satisfactory for injecting chopped foods into a deaerator because it clogs easily and also tends to reduce the particle size of the chopped foods.

It is an object of this invention to provide a valve for discharging chopped foods into a deaerator in a thin film to allow easy removal of air from the food.

Another object of this invention is to provide a sanitary valve construction which may be readily cleaned and will not trap the material handled by the valve within the valve.

It is also an object of this invention to provide a self-releasing valve which will increase the opening in the valve as the fluid pressure within the valve is increased.

Still another object is to provide a non-clogging valve.

Other objects of this invention will become apparent in the following detailed description.

A valve constructed according to this invention has a casing which is similar to the conventional pipe fitting T. One of the line outlets of the T serves as the valve port. A disc, slidably mounted on a stem extending through the port of the valve, cooperates with the walls of the T surrounding the valve port, to control the size of the valve opening. Resilient means holding the disc in its normal position may be compressed by an increase of pressure in the valve to move the disc away from the T and increase the area of the valve port.

The single figure of the drawing is a longitudinal cross-sectional view of a valve constructed according to this invention.

Referring to the drawing, a valve casing 1 is similar to an ordinary pipe fitting T. The lateral outlet of the T serves as an inlet 2 of the valve. One of the line outlets 3 of the T forms the valve port 4. The other line outlet 5 of the T is closed by a cap 6 which may be easily removed for cleaning the valve.

The casing constructed from a T in the manner described contains large, unobstructed passages which minimize trapping of particles of the material passing through the valve and allow easy cleaning of the valve's inner surface. In food processing it is especially desirable that the valve be of a construction which allows it to be maintained in a highly sanitary condition.

The walls of the casing 1 are tapered at outlet 3 to form a valve seat 7 surrounding the valve port 4. Similarly, outlet 5 is tapered for the engagement with a conical section 8 of cap 6 to close one end of the T.

Cap 6 is a disc having slightly larger diameter than the outlet 5 of the casing 1. As mentioned above, the under surface of the cap is conical and engages the tapered surface of the outlet 5 in a fluid-tight fit to close the end of the casing. Cap 6 is held firmly in place by a nut 9 which screws onto the threads on the outer surface of the casing 1. Nut 9 has an arm 10 which engages the outer surface of the cap 6 to hold it in place.

It will be noted that the construction of cap 6 provides a smooth, easily cleaned surface at that end of the casing 1. None of the fluid passing through the valve can pass the smooth, tapered surface 5. In contrast with the structure described would be a cap which was merely screwed in place. In a cap of the latter type it would be possible for the fluid passing through the valve to flow into the threads.

Cap 6 is drilled centrally at 11 for the reception of a valve stem 12. An elongated collar 13 is welded to the lower surface of the cap to form an extension of the hole drilled at 11. Valve stem 12 fits snugly but slidably in collar 13 and the aperture 11 in cap 6.

An adjustable collar 14 is locked firmly to the valve stem 12 immediately below the lower end of the collar 13 by means of a set screw 15. Valve stem 12 is threaded at its upper end 16 for the reception of a nut 17 and washer 18. Nut 17 is tightened until the lower end of collar 13 bears forcefully against collar 14 to hold the valve stem rigidly in place. Collar 14 may also further seal the lower end of collar 13.

A disc 19 is slidably mounted on the lower end of valve stem 12. Disc 19 is preferably substantially conical in shape with the vertex 20 of the cone extending through valve port 4 into the casing 1. The base 21 of the conical section 22 of disc 19 lies a short distance outside of the valve casing 1. Preferably the walls of conical section 22 of disc 19 are parallel to the tapered surface 7 to provide an annular port having parallel walls for the discharge of the fluid from the valve.

Around the base 21 of the conical disc 19 is a concave surface 23 which extends radially beyond the walls of the casing. Concave surface 23 is adapted to direct the fluid discharged from the valve outwardly and slightly upwardly in a sheet surrounding the outlet 3 of the casing. The discharging of the fluid in a thin sheet from the valve allows any entrained or dissolved air to escape readily from the fluid.

A recess 24 in the outer surface of the disc 19 is provided for the reception of a helical spring 25 surrounding the valve stem 12. A bushing 27 rides on valve stem 12 at the outer end of spring 25 and is held in place by nuts 28 and 29 which are screwed on the threaded lower end 30 of the valve stem. Helical spring 25 bears against the inner end 26 of recess 24 and bushing 27 to urge disc 19 into the casing. The maximum inward movement of the disc 19 is controlled by a collar 31 which is secured to the valve stem 12 by means of set screw 32. The position of collar 31 may be adjusted to control the minimum opening between the valve seat 7 and the conical surface 22 of the disc 19.

It will be noted that the port 4 of the valve controlling the flow of the fluid therethrough is at the outlet of the casing. In this manner trapping of particles within the valve casing which would cause an unsanitary condition is avoided since the material passing through the valve is discharged as soon as the pressure is released.

In operation, the chopped foods are introduced into the valve through inlet 2. The foods pass through the casing 1 and through port 4 between tapered surface 7 and disc 19, and are discharged into the deaerator. The opening between the tapered surface 7 and the disc 19 is adjusted by means of stop 31 and will depend upon the maximum size of the particles in the chopped foods passing through the valve. If an oversized particle becomes trapped in the valve port and interferes with the flow to increase the pressure within the valve casing, the fluid within the valve will exert sufficient pressure on the disc 19 to compress spring 25 and increase the size of the port 4. Similarly, if the rate of flow through the valve is variable, any increase in pressure within the casing resulting from an increase in the rate of flow will tend to increase the opening of the valve port 4. The valve is thus non-clogging and self-adjusting over a wide range of flow rates.

The pressure required to increase the opening of valve port 4 may be adjusted by means of the nuts 28 and 29 on the lower end of valve stem 12. If it is desired that the fluid pass through the valve under high pressure and be discharged forcefully from the valve, spring 25 may be highly compressed even when the disc 19 is at its innermost position. It will then require a relatively large increase in pressure within the casing 1 to produce an effective increase in the area of valve port 4.

The concave surface 23 around the lower rim of the disc throws the fluid discharged from the valve upward and outward in a thin sheet. Any air which may be present in the fluid is thereby readily released as the fluid falls through the deaerator.

The valve herein described is simple in construction and is especially desirable where it is necessary to maintain the valve in a sanitary condition. There are no inaccessible regions where the fluid passing through the valve might become trapped and remain over long periods. The smooth, flat surfaces of the valve which are exposed to the fluid greatly facilitates cleaning.

The present invention has been described in detail as applied to a particular valve structure. It is to be understood that the scope of the invention is not limited to the specific details but is defined by the appended claims.

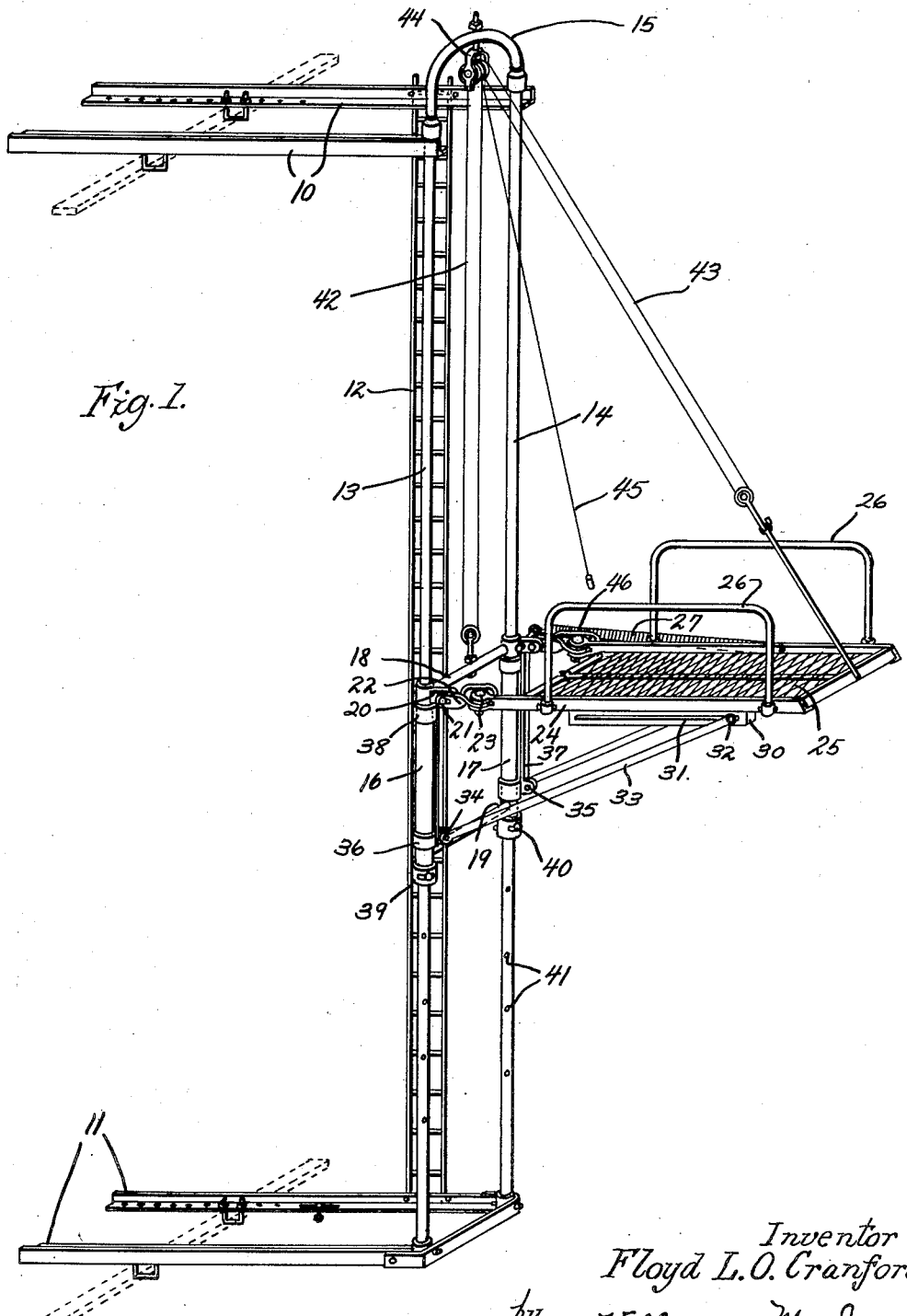

I claim:

1. A spray valve comprising a casing consisting of a T, the lateral outlet of said T being the inlet of the valve, one of the line outlets of the T forming the discharge port of the valve, the wall of the T surrounding said line outlet forming the seat of the valve, a cap closing the other line outlet of the T, a stem secured to and extending from the cap through the discharge port of the valve, a disc slidably mounted on the stem, means external of the casing resiliently urging said disc towards the seat to control the area of the port, and means on the stem limiting the movement of the disc towards the seat.

2. A spray valve comprising a casing consisting of a T, the lateral outlet of the T providing an inlet for the valve, one of the line outlets of the T forming the port of the valve, the wall of the valve port tapering outwardly, a cap closing the other outlet of the T, a stem adjustably secured to the cap extending through the port of the valve, a conical disc slidably mounted on the stem, the vertex of the conical disc extending into the T, the base of the disc lying external of the T and having a diameter larger than the port of the valve, resilient means external of the casing urging the disc along the stem into the T, and means on the stem limiting the movement of the disc towards the seat.

3. A spray valve comprising a casing having an inlet and outlet, said casing having unobstructed tubular passages therethrough, the walls of the casing surrounding the outlet of the valve being tapered to form a valve seat, a stem secured to the casing extending through the valve outlet, a flared disc slidably mounted on the stem, said flared disc having a concave surface adjacent the valve seat to direct the fluid discharged from the valve, resilient means external of the disc urging the disc towards the valve seat responsive to the pressure within the valve, and a stop on the stem limiting the inward movement of the disc on the stem to control the minimum opening of the valve.

4. A spray valve comprising a casing, said casing consisting of a T, the lateral outlet of the T forming an inlet for the valve, one of the line outlets of the T being the valve port, a cap covering the other line outlet, a stem rigidly and adjustably secured to the cap extending through the valve port, the wall surface of the casing surrounding the line outlets being tapered outwardly to form a seat for the cap at one end of the T and a valve seat at the other end, a conical disc slidably mounted on the stem, the vertex of the cone extending into the valve port whereby the surface of the disc cooperates with the valve seat to define the port opening, the base of said conical disc having a larger diameter than the valve seat, said disc having a concave surface adjacent the valve seat for directing the fluid discharged from the valve, resilient means external of the disc urging the disc along the stem towards the valve seat responsive to the pressure within the valve, and a stop limiting the inward movement of the disc.

5. A spray valve for controlling the flow of a liquid comprising a valve body having an inlet and an outlet, a stem secured to the valve body extending through the outlet of the valve, a disc with tapered edges slidably mounted on the stem and having its base external of the valve outlet, the edges of said disc combining with the